(12) United States Patent
Schroeder et al.

(10) Patent No.: US 7,770,660 B2
(45) Date of Patent: Aug. 10, 2010

(54) MID-HANDLE DRILL CONSTRUCTION AND ASSEMBLY PROCESS

(75) Inventors: James D. Schroeder, Dallastown, PA (US); Paul S. White, Ellicott City, MD (US); Craig A. Oktavec, Forest Hill, MD (US); Paul J. Wisniewski, Baltimore, MD (US); Edward J. Grasso, Baltimore, MD (US); Paul K. Trautner, York, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/986,668

(22) Filed: Nov. 21, 2007

(65) Prior Publication Data

US 2009/0126964 A1 May 21, 2009

(51) Int. Cl.
*B25F 5/02* (2006.01)
(52) U.S. Cl. .............. 173/217; 173/1; 173/40; 173/216; 173/171
(58) Field of Classification Search .......... 173/217, 173/1, 40, 216, 171; 310/47, 50
See application file for complete search history.

(56) References Cited

U.S. PATENT DOCUMENTS

| | | | |
|---|---|---|---|
| 799,131 | A | 9/1905 | Woodruff |
| 1,325,464 | A | 12/1919 | Decker |
| 1,411,538 | A | 4/1922 | Sweetland |
| 1,503,809 | A | 8/1924 | Schulz et al. |
| 1,511,566 | A | 10/1924 | Kollock |
| 1,518,089 | A | 12/1924 | Manquen |
| 1,651,822 | A | 12/1927 | Johnston |
| 1,805,692 | A | 5/1931 | Ferenci |
| 1,915,542 | A | 6/1933 | Lundin et al. |
| 2,024,276 | A | 12/1935 | Desoutter |
| 2,225,091 | A | 12/1940 | Wilhide |
| 2,263,709 | A | 11/1941 | Sittert |

(Continued)

FOREIGN PATENT DOCUMENTS

CH 546615 3/1974

(Continued)

OTHER PUBLICATIONS

Non-Final Office Action, copending U.S. Appl. No. 11/986,688, mailed Jun. 10, 2009.

(Continued)

*Primary Examiner*—Brian D Nash
(74) *Attorney, Agent, or Firm*—Harness, Dickey & Pierce, P.L.C.

(57) ABSTRACT

A power tool can include a gear case, a motor having first and second sets of lead wires, a housing assembly, and a field case. The field case may include a front portion configured for engaging the gear case and a rear portion. The housing assembly may include first and second generally symmetrical housing segments configured for engaging the field case and forming a mid-handle grip. The first set of lead wires may be routed through the front portion of the field case directly to a trigger switch assembly. A method for assembling a mid-handle power tool is also provided and may include routing lead wires through a ventilation path between the field case and trigger assembly.

20 Claims, 9 Drawing Sheets

U.S. PATENT DOCUMENTS

| | | | |
|---|---|---|---|
| 2,344,673 A | 3/1944 | Brown | |
| 2,456,571 A | 12/1948 | Turner et al. | |
| 2,531,849 A | 11/1950 | Karleen | |
| 2,631,696 A | 3/1953 | Yarber | |
| 2,668,426 A | 2/1954 | Hoover | |
| 2,692,486 A | 10/1954 | Anderson | |
| 2,727,602 A | 12/1955 | Saives | |
| 2,834,442 A | 5/1958 | Sturrock | |
| 2,854,831 A | 10/1958 | Rothweiler | |
| 2,860,498 A | 11/1958 | Crossley | |
| 2,868,426 A | 1/1959 | Groves | |
| 2,873,832 A | 2/1959 | Helm | |
| 2,882,704 A | 4/1959 | Quackenbush | |
| 2,911,841 A | 11/1959 | Miller | |
| 2,942,490 A | 6/1960 | Riley et al. | |
| 2,957,323 A | 10/1960 | Elliott et al. | |
| 2,995,226 A | 8/1961 | Gilder | |
| 3,005,325 A | 10/1961 | Eckman | |
| 3,021,723 A | 2/1962 | Happe | |
| 3,028,763 A | 4/1962 | Vetsch | |
| 3,030,818 A | 4/1962 | Zagar | |
| 3,110,381 A | 11/1963 | Leu | |
| 3,120,845 A | 2/1964 | Horner | |
| 3,178,955 A | 4/1965 | Enders et al. | |
| 3,178,956 A | 4/1965 | Stanley | |
| 3,205,985 A | 9/1965 | Pearl | |
| 3,243,023 A | 3/1966 | Boyden et al. | |
| 3,244,030 A | 4/1966 | Godfret | |
| 3,295,187 A | 1/1967 | Plummer | |
| 3,329,185 A | 7/1967 | Hettich et al. | |
| 3,334,448 A | 8/1967 | Alexander | |
| 3,357,275 A | 12/1967 | Green, Jr. et al. | |
| 3,396,593 A | 8/1968 | Moores, Jr. | |
| 3,413,498 A | 11/1968 | Bowen, III et al. | |
| 3,432,703 A | 3/1969 | Cheps et al. | |
| 3,433,082 A | 3/1969 | Bitter et al. | |
| 3,436,994 A | 4/1969 | Diener et al. | |
| 3,491,840 A | 1/1970 | Haviland et al. | |
| 3,500,696 A | 3/1970 | Berube | |
| 3,517,574 A | 6/1970 | Glatfelter | |
| 3,545,310 A | 12/1970 | Porath et al. | |
| 3,545,776 A | 12/1970 | Haviland | |
| 3,546,502 A | 12/1970 | Botefuhr et al. | |
| 3,586,143 A | 6/1971 | Hutchison | |
| 3,652,879 A | 3/1972 | Plunkett et al. | |
| 3,679,244 A | 7/1972 | Reddy | |
| 3,680,642 A | 8/1972 | Kirn et al. | |
| 3,685,594 A | 8/1972 | Koehler | |
| 3,686,957 A | 8/1972 | Kirn et al. | |
| 3,691,407 A | 9/1972 | Klett et al. | |
| 3,699,366 A * | 10/1972 | Wood | 310/50 |
| 3,703,646 A * | 11/1972 | Jacyno | 310/47 |
| 3,736,992 A | 6/1973 | Zanda et al. | |
| 3,777,825 A | 12/1973 | Gullich | |
| 3,785,443 A | 1/1974 | Armbruster | |
| 3,789,933 A | 2/1974 | Jarecki | |
| 3,794,124 A | 2/1974 | Biersack | |
| 3,799,275 A | 3/1974 | Plattenhardt et al. | |
| 3,808,904 A | 5/1974 | Botsch et al. | |
| 3,809,168 A | 5/1974 | Fromm | |
| 3,818,255 A | 6/1974 | Wagner | |
| 3,827,276 A | 8/1974 | Willers | |
| 3,829,722 A | 8/1974 | Rosenthal, Jr. et al. | |
| 3,831,048 A | 8/1974 | Wagner | |
| 3,834,468 A | 9/1974 | Hettich et al. | |
| 3,835,715 A | 9/1974 | Howell | |
| 3,837,410 A | 9/1974 | Maxwell | |
| 3,845,373 A | 10/1974 | Totsu et al. | |
| 3,866,692 A | 2/1975 | Stelljes | |
| 3,872,951 A | 3/1975 | Hastings, Jr. | |
| 3,877,253 A | 4/1975 | Yeagle | |
| 3,915,034 A | 10/1975 | Ward | |
| 3,924,692 A | 12/1975 | Saari | |
| 3,934,688 A | 1/1976 | Sides et al. | |
| 3,955,628 A | 5/1976 | Grozinger et al. | |
| 3,959,677 A | 5/1976 | Grieb | |
| 3,998,278 A | 12/1976 | Stiltz et al. | |
| 4,050,875 A | 9/1977 | Katzman et al. | |
| 4,081,704 A | 3/1978 | Vassos et al. | |
| 4,082,151 A | 4/1978 | Finney | |
| 4,098,351 A | 7/1978 | Alessio | |
| 4,103,914 A | 8/1978 | Rohm | |
| 4,158,313 A | 6/1979 | Smith | |
| 4,158,970 A | 6/1979 | Laughon | |
| 4,159,050 A | 6/1979 | Hopkins, Sr. et al. | |
| 4,161,242 A | 7/1979 | Moores, Jr. et al. | |
| 4,173,849 A | 11/1979 | Mar | |
| 4,199,160 A | 4/1980 | Bent | |
| 4,204,580 A | 5/1980 | Nalley | |
| 4,223,744 A | 9/1980 | Lovingood | |
| 4,229,981 A | 10/1980 | Macky | |
| 4,232,750 A | 11/1980 | Antipov et al. | |
| 4,238,978 A | 12/1980 | Leone | |
| 4,265,347 A | 5/1981 | Dischler | |
| 4,267,914 A | 5/1981 | Saar | |
| 4,277,074 A | 7/1981 | Kilberis | |
| 4,280,359 A | 7/1981 | Schmid et al. | |
| 4,305,541 A | 12/1981 | Barrett et al. | |
| 4,306,264 A | 12/1981 | Alessio | |
| 4,314,170 A | 2/1982 | Sahrbacker | |
| 4,317,578 A | 3/1982 | Welch | |
| 4,324,512 A | 4/1982 | Siroky | |
| 4,389,146 A | 6/1983 | Coder | |
| 4,390,311 A | 6/1983 | Kuhlmann | |
| 4,400,995 A | 8/1983 | Palm | |
| 4,407,615 A | 10/1983 | Kuhlmann | |
| 4,410,846 A | 10/1983 | Gerber et al. | |
| 4,418,766 A | 12/1983 | Grossmann | |
| 4,443,137 A | 4/1984 | Albrent et al. | |
| 4,450,672 A | 5/1984 | Dynie | |
| 4,456,076 A | 6/1984 | Schmid et al. | |
| 4,460,296 A | 7/1984 | Sivertson, Jr. | |
| 4,467,896 A | 8/1984 | Sauerwein et al. | |
| 4,468,826 A | 9/1984 | Moores, Jr. | |
| 4,474,077 A | 10/1984 | Debelius | |
| 4,479,555 A | 10/1984 | Grossmann et al. | |
| 4,489,525 A | 12/1984 | Heck | |
| 4,493,223 A | 1/1985 | Kishi et al. | |
| 4,498,682 A | 2/1985 | Glore | |
| 4,506,743 A | 3/1985 | Grossmann | |
| 4,523,116 A * | 6/1985 | Dibbern et al. | 310/71 |
| 4,527,680 A | 7/1985 | Sato | |
| 4,540,318 A | 9/1985 | Hornung et al. | |
| 4,559,577 A | 12/1985 | Shoji et al. | |
| 4,569,125 A * | 2/1986 | Antl et al. | 29/596 |
| 4,573,380 A | 3/1986 | Bald | |
| 4,582,331 A | 4/1986 | Rohm | |
| 4,585,077 A | 4/1986 | Bergler | |
| 4,592,560 A | 6/1986 | Neumaier et al. | |
| 4,604,006 A | 8/1986 | Shoji et al. | |
| 4,616,525 A | 10/1986 | Ueberschar | |
| 4,623,810 A | 11/1986 | Smith | |
| 4,635,502 A | 1/1987 | George | |
| 4,655,103 A | 4/1987 | Schreiber et al. | |
| 4,669,930 A | 6/1987 | Stenmark | |
| 4,682,918 A | 7/1987 | Palm | |
| 4,695,065 A | 9/1987 | Komatsu et al. | |
| 4,706,791 A | 11/1987 | Magliano | |
| 4,710,071 A | 12/1987 | Koehler et al. | |
| 4,754,669 A | 7/1988 | Verdier et al. | |
| 4,762,035 A | 8/1988 | Fushiya et al. | |
| 4,763,733 A | 8/1988 | Neumaier | |
| 4,775,269 A | 10/1988 | Brix | |
| 4,780,654 A | 10/1988 | Shoji et al. | |

| | | | | | | |
|---|---|---|---|---|---|---|
| 4,804,048 A | 2/1989 | Porth, Jr. | | 5,628,374 A | 5/1997 | Dibbern, Jr. |
| 4,819,319 A | 4/1989 | Rohm | | 5,653,294 A | 8/1997 | Thurler |
| 4,823,885 A | 4/1989 | Okumura | | 5,704,257 A | 1/1998 | Kottke et al. |
| 4,824,298 A | 4/1989 | Lippacher et al. | | 5,704,433 A | 1/1998 | Bourner et al. |
| 4,831,364 A | 5/1989 | Shinohara et al. | | 5,711,379 A | 1/1998 | Amano et al. |
| 4,834,192 A | 5/1989 | Hansson | | 5,711,380 A | 1/1998 | Chen |
| 4,836,563 A | 6/1989 | Rohm | | 5,718,014 A | 2/1998 | deBlois et al. |
| 4,848,779 A | 7/1989 | Wheeler et al. | | 5,722,894 A | 3/1998 | Kojima |
| 4,878,405 A | 11/1989 | Wolfe | | 5,732,805 A | 3/1998 | Nakamura |
| 4,885,511 A | 12/1989 | Millauer et al. | | 5,738,177 A | 4/1998 | Schell et al. |
| 4,898,249 A | 2/1990 | Ohmori | | 5,787,996 A | 8/1998 | Funfer |
| 4,901,831 A | 2/1990 | Ito et al. | | 5,788,021 A | 8/1998 | Tsai |
| 4,902,025 A | 2/1990 | Zimdars | | 5,842,527 A | 12/1998 | Arakawa et al. |
| 4,955,623 A | 9/1990 | Rohm | | 5,857,814 A | 1/1999 | Jang |
| 5,004,054 A | 4/1991 | Sheen | | 5,868,208 A | 2/1999 | Peisert et al. |
| 5,007,776 A | 4/1991 | Shoji | | 5,896,973 A | 4/1999 | Hochmuth et al. |
| 5,014,793 A | 5/1991 | Germanton et al. | | 5,947,254 A | 9/1999 | Jones |
| 5,016,501 A | 5/1991 | Holzer, Jr. | | 5,951,026 A | 9/1999 | Harman, Jr. et al. |
| 5,016,591 A | 5/1991 | Nanyoshi et al. | | 5,984,022 A | 11/1999 | Harman, Jr. et al. |
| 5,025,903 A | 6/1991 | Elligson | | 5,992,257 A | 11/1999 | Nemetz et al. |
| 5,035,547 A | 7/1991 | Shoji | | 6,010,426 A | 1/2000 | Nakamura |
| 5,036,928 A | 8/1991 | Mark | | 6,015,017 A | 1/2000 | Lauterwald |
| 5,044,643 A | 9/1991 | Nakamura | | 6,035,947 A | 3/2000 | Chung |
| 5,052,497 A | 10/1991 | Houben et al. | | 6,047,971 A | 4/2000 | Harman, Jr. et al. |
| 5,054,796 A | 10/1991 | Rohm | | 6,070,675 A | 6/2000 | Mayer et al. |
| 5,056,607 A | 10/1991 | Sanders | | 6,072,675 A | 6/2000 | Murakami et al. |
| 5,062,743 A | 11/1991 | Wieland et al. | | 6,079,716 A | 6/2000 | Harman, Jr. et al. |
| 5,083,620 A | 1/1992 | Fushiya et al. | | 6,082,221 A | 7/2000 | Boing et al. |
| 5,085,126 A | 2/1992 | Mukoyama | | 6,086,282 A | 7/2000 | Dutt et al. |
| 5,089,729 A | 2/1992 | Moores, Jr. | | 6,107,762 A | 8/2000 | Schauer |
| 5,096,339 A | 3/1992 | Shoji | | 6,109,364 A | 8/2000 | Demuth et al. |
| 5,105,130 A | 4/1992 | Barker et al. | | 6,127,751 A | 10/2000 | Kristen et al. |
| 5,113,951 A | 5/1992 | Houben et al. | | 6,138,772 A | 10/2000 | Miescher et al. |
| 5,115,175 A | 5/1992 | Fletcher | | 6,139,228 A | 10/2000 | Longo |
| 5,125,142 A | 6/1992 | Kosho et al. | | 6,142,242 A | 11/2000 | Okumura et al. |
| 5,171,030 A | 12/1992 | Rohm | | 6,144,121 A | 11/2000 | Ishida et al. |
| 5,172,923 A | 12/1992 | Nakamura | | 6,144,122 A | 11/2000 | Covell et al. |
| 5,183,274 A | 2/1993 | Sakamaki | | 6,162,154 A | 12/2000 | Davis |
| 5,195,760 A | 3/1993 | Wheeler et al. | | 6,176,321 B1 | 1/2001 | Arakawa et al. |
| 5,213,017 A | 5/1993 | Jones et al. | | 6,176,801 B1 | 1/2001 | Chen |
| 5,236,206 A | 8/1993 | Rohm | | D437,761 S | 2/2001 | Okumura et al. |
| 5,238,336 A | 8/1993 | Sanders et al. | | 6,192,996 B1 | 2/2001 | Sakaguchi et al. |
| 5,259,465 A | 11/1993 | Mukoyama | | D439,123 S | 3/2001 | Sakai et al. |
| 5,261,679 A | 11/1993 | Nakamura | | 6,196,554 B1 | 3/2001 | Gaddis et al. |
| 5,271,471 A | 12/1993 | Sasaki | | 6,199,640 B1 | 3/2001 | Hecht |
| 5,272,845 A | 12/1993 | Burkley | | 6,202,759 B1 | 3/2001 | Chen |
| 5,277,527 A | 1/1994 | Yokota et al. | | 6,213,222 B1 | 4/2001 | Banach |
| 5,311,089 A | 5/1994 | Straetgen et al. | | 6,213,224 B1 | 4/2001 | Furuta et al. |
| 5,322,303 A | 6/1994 | Nakamura | | 6,223,833 B1 | 5/2001 | Thurler et al. |
| 5,325,931 A | 7/1994 | Woods | | 6,230,819 B1 | 5/2001 | Chen |
| 5,343,961 A | 9/1994 | Ichikawa | | 6,241,259 B1 | 6/2001 | Gaddis et al. |
| 5,346,023 A | 9/1994 | Takagi et al. | | 6,248,007 B1 | 6/2001 | deBlois et al. |
| 5,351,039 A | 9/1994 | Oketani et al. | | 6,273,200 B1 | 8/2001 | Smith et al. |
| 5,375,857 A | 12/1994 | Rohm | | 6,277,013 B1 | 8/2001 | Sasaki et al. |
| 5,375,858 A | 12/1994 | Rohm | | 6,279,714 B1 | 8/2001 | Hsu |
| 5,407,215 A | 4/1995 | Yang | | 6,293,559 B1 | 9/2001 | Harman, Jr. et al. |
| 5,430,944 A | 7/1995 | Shilling | | 6,305,481 B1 | 10/2001 | Yamazaki et al. |
| 5,451,127 A | 9/1995 | Chung | | 6,311,787 B1 | 11/2001 | Berry et al. |
| 5,456,324 A | 10/1995 | Takagi et al. | | 6,350,087 B1 | 2/2002 | Berry et al. |
| 5,458,206 A | 10/1995 | Bourner et al. | | 6,394,191 B1* | 5/2002 | Nakane ...................... 173/217 |
| 5,458,345 A | 10/1995 | Amyot | | 6,431,289 B1 | 8/2002 | Potter et al. |
| 5,464,230 A | 11/1995 | Rohm | | 6,446,734 B1 | 9/2002 | Williams et al. |
| 5,496,139 A | 3/1996 | Ghode et al. | | 6,455,186 B1 | 9/2002 | Moores, Jr. et al. |
| 5,526,460 A | 6/1996 | DeFrancesco et al. | | 6,457,535 B1 | 10/2002 | Tanaka |
| 5,533,581 A | 7/1996 | Barth et al. | | RE37,905 E | 11/2002 | Bourner et al. |
| 5,558,478 A | 9/1996 | Odendahl et al. | | 6,479,958 B1 | 11/2002 | Thompson et al. |
| 5,563,482 A | 10/1996 | Shaw et al. | | 6,488,286 B2 | 12/2002 | Yaksich |
| 5,573,074 A | 11/1996 | Thames et al. | | 6,488,287 B2 | 12/2002 | Gaddis et al. |
| 5,577,872 A | 11/1996 | Nakamura | | 6,488,451 B1 | 12/2002 | Hartman |
| 5,584,619 A | 12/1996 | Guzzella | | 6,497,316 B1 | 12/2002 | Hsu |
| 5,588,496 A | 12/1996 | Elger | | 6,502,646 B2 | 1/2003 | Wiens |
| 5,624,000 A | 4/1997 | Miller | | D470,379 S | 2/2003 | Andriolo |
| 5,624,013 A | 4/1997 | Tsai | | 6,513,604 B2 | 2/2003 | Hanke |

| | | |
|---|---|---|
| 6,520,267 B2 | 2/2003 | Funfer et al. |
| 6,536,536 B1 | 3/2003 | Gass et al. |
| 6,543,549 B1 | 4/2003 | Riedl et al. |
| 6,550,546 B2 | 4/2003 | Thurler et al. |
| 6,557,648 B2 | 5/2003 | Ichijyou et al. |
| 6,586,855 B2 | 7/2003 | Burger et al. |
| 6,595,300 B2 | 7/2003 | Milbourne |
| 6,612,476 B2 | 9/2003 | Smolinski |
| 6,645,666 B1 | 11/2003 | Moores, Jr. et al. |
| 6,655,470 B1 | 12/2003 | Chen |
| 6,666,284 B2 | 12/2003 | Stirm |
| 6,676,557 B2 | 1/2004 | Milbourne et al. |
| 6,683,396 B2 | 1/2004 | Ishida et al. |
| D486,049 S | 2/2004 | Sughura et al. |
| 6,688,406 B1 | 2/2004 | Wu et al. |
| 6,691,796 B1 | 2/2004 | Wu |
| 6,691,799 B2 | 2/2004 | Kuhnle et al. |
| 6,719,067 B2 | 4/2004 | Taga |
| 6,725,548 B1 | 4/2004 | Kramer et al. |
| 6,725,944 B2 | 4/2004 | Burger et al. |
| 6,729,812 B2 | 5/2004 | Yaksich et al. |
| D490,677 S | 6/2004 | Chung et al. |
| 6,776,244 B2 | 8/2004 | Milbourne |
| D496,573 S | 9/2004 | Cooper |
| D496,574 S | 9/2004 | Sakai et al. |
| 6,793,023 B2 | 9/2004 | Holzer et al. |
| 6,796,921 B1 | 9/2004 | Buck et al. |
| 6,805,207 B2 | 10/2004 | Hagan et al. |
| 6,814,158 B2 | 11/2004 | Bieber et al. |
| 6,848,985 B2 | 2/2005 | Lamprecht et al. |
| 6,857,338 B2 | 2/2005 | Tsergas |
| 6,860,341 B2 | 3/2005 | Spielmann et al. |
| 6,866,105 B2 | 3/2005 | Pfisterer et al. |
| 6,868,919 B1 | 3/2005 | Manschitz et al. |
| 6,886,643 B2 | 5/2005 | Riley et al. |
| 6,892,827 B2 | 5/2005 | Toyama et al. |
| 6,913,089 B2 | 7/2005 | Stirm |
| 6,913,090 B2 | 7/2005 | Droste et al. |
| 6,918,327 B2 | 7/2005 | Ayrton |
| 6,923,268 B2 | 8/2005 | Totsu |
| 6,949,309 B2 | 9/2005 | Moores, Jr. et al. |
| 6,957,706 B2 | 10/2005 | Burger et al. |
| 6,983,807 B2 | 1/2006 | Mayr et al. |
| 6,984,188 B2 | 1/2006 | Potter et al. |
| 7,000,709 B2 | 2/2006 | Milbourne |
| 7,004,357 B2 | 2/2006 | Shew |
| 7,008,151 B2 | 3/2006 | Yaksich et al. |
| 7,014,945 B2 | 3/2006 | Moores, Jr. et al. |
| 7,021,399 B2 * | 4/2006 | Driessen ..................... 173/29 |
| D521,338 S | 5/2006 | Wai |
| 7,036,608 B2 | 5/2006 | Garvey et al. |
| 7,044,882 B2 | 5/2006 | Eisenhardt |
| 7,048,107 B1 | 5/2006 | Geis et al. |
| 7,051,820 B2 | 5/2006 | Stirm |
| 7,056,616 B2 | 6/2006 | Moores, Jr. et al. |
| 7,066,691 B2 | 6/2006 | Doyle et al. |
| 7,073,605 B2 | 7/2006 | Saito et al. |
| 7,073,606 B2 | 7/2006 | Mamber et al. |
| 7,101,300 B2 | 9/2006 | Milbourne et al. |
| 7,121,359 B2 | 10/2006 | Frauhammer et al. |
| 7,124,839 B2 | 10/2006 | Furuta et al. |
| 7,131,503 B2 | 11/2006 | Furuta et al. |
| 7,134,509 B2 | 11/2006 | Rahm |
| 7,134,510 B2 | 11/2006 | Justis et al. |
| 7,156,402 B2 | 1/2007 | Mack |
| 7,166,939 B2 | 1/2007 | Voigt et al. |
| 7,174,969 B2 | 2/2007 | Droste |
| 7,213,659 B2 | 5/2007 | Saito et al. |
| 7,216,749 B2 | 5/2007 | Droste |
| 7,220,211 B2 | 5/2007 | Potter et al. |
| 7,223,195 B2 | 5/2007 | Milbourne et al. |
| 7,225,884 B2 | 6/2007 | Aeberhard |
| 7,264,065 B2 | 9/2007 | Simm et al. |
| 7,281,591 B2 * | 10/2007 | Bone ......................... 173/217 |
| 7,303,026 B2 | 12/2007 | Frauhammer et al. |
| 7,308,748 B2 | 12/2007 | Kokish |
| 7,314,097 B2 | 1/2008 | Jenner et al. |
| 7,404,781 B2 | 7/2008 | Milbourne et al. |
| 2002/0033267 A1 | 3/2002 | Schweizer et al. |
| 2002/0096343 A1 * | 7/2002 | Potter et al. ................. 173/216 |
| 2002/0098938 A1 | 7/2002 | Milbourne et al. |
| 2002/0146663 A1 | 10/2002 | Nakanishi et al. |
| 2003/0089511 A1 | 5/2003 | Tsuneda et al. |
| 2003/0102844 A1 | 6/2003 | Bailey |
| 2004/0051256 A1 | 3/2004 | Ayrton |
| 2004/0056539 A1 | 3/2004 | Du |
| 2004/0134673 A1 | 7/2004 | Droste |
| 2004/0139835 A1 | 7/2004 | Wright et al. |
| 2004/0156190 A1 | 8/2004 | Tsuruta et al. |
| 2004/0157698 A1 | 8/2004 | Hara et al. |
| 2004/0206524 A1 | 10/2004 | Rahm |
| 2004/0211575 A1 | 10/2004 | Soika et al. |
| 2004/0211576 A1 | 10/2004 | Milbourne et al. |
| 2004/0226731 A1 | 11/2004 | Faatz et al. |
| 2004/0263008 A1 | 12/2004 | Voigt et al. |
| 2005/0015636 A1 | 1/2005 | Chen et al. |
| 2005/0022358 A1 | 2/2005 | Hagan et al. |
| 2005/0025586 A1 | 2/2005 | Mikiya et al. |
| 2005/0028996 A1 | 2/2005 | Toukairin et al. |
| 2005/0028997 A1 | 2/2005 | Hagan et al. |
| 2005/0061524 A1 | 3/2005 | Hagan et al. |
| 2005/0087353 A1 | 4/2005 | Oki et al. |
| 2005/0093251 A1 | 5/2005 | Buchholz et al. |
| 2005/0150669 A1 | 7/2005 | Umemura et al. |
| 2005/0153636 A1 | 7/2005 | Numata et al. |
| 2005/0161241 A1 | 7/2005 | Frauhammer et al. |
| 2005/0194164 A1 | 9/2005 | Saito et al. |
| 2005/0194165 A1 | 9/2005 | Saito et al. |
| 2005/0199404 A1 | 9/2005 | Furuta et al. |
| 2005/0218186 A1 | 10/2005 | Forster |
| 2005/0224242 A1 | 10/2005 | Britz et al. |
| 2005/0247459 A1 | 11/2005 | Voigt et al. |
| 2005/0257944 A1 | 11/2005 | Cooper |
| 2005/0257945 A1 * | 11/2005 | Justis et al. ................. 173/217 |
| 2005/0271489 A1 | 12/2005 | Gensmann et al. |
| 2005/0279517 A1 | 12/2005 | Hoffman et al. |
| 2005/0284648 A1 | 12/2005 | Frauhammer et al. |
| 2006/0021771 A1 | 2/2006 | Milbourne et al. |
| 2006/0027978 A1 | 2/2006 | Young et al. |
| 2006/0048959 A1 | 3/2006 | Sakai et al. |
| 2006/0061048 A1 | 3/2006 | Puzio et al. |
| 2006/0061049 A1 | 3/2006 | Zhang et al. |
| 2006/0086514 A1 | 4/2006 | Aeberhard |
| 2006/0086517 A1 | 4/2006 | Bone |
| 2006/0090913 A1 | 5/2006 | Furuta |
| 2006/0096771 A1 * | 5/2006 | Brotto ......................... 173/217 |
| 2006/0102364 A1 | 5/2006 | Yung |
| 2006/0104735 A1 | 5/2006 | Zeiler et al. |
| 2006/0113092 A1 | 6/2006 | Rogers et al. |
| 2006/0113097 A1 | 6/2006 | Simm et al. |
| 2006/0141915 A1 | 6/2006 | Walstrom et al. |
| 2006/0144602 A1 | 7/2006 | Arich et al. |
| 2006/0159577 A1 | 7/2006 | Soika et al. |
| 2006/0175915 A1 | 8/2006 | Voigt et al. |
| 2006/0180327 A1 | 8/2006 | Nagasaka et al. |
| 2006/0185866 A1 | 8/2006 | Jung et al. |
| 2006/0222930 A1 | 10/2006 | Aradachi et al. |
| 2006/0232021 A1 | 10/2006 | Schell et al. |
| 2006/0233618 A1 | 10/2006 | Puzio et al. |
| 2006/0233621 A1 | 10/2006 | Schell et al. |
| 2006/0244223 A1 | 11/2006 | Zhon et al. |
| 2006/0244224 A1 | 11/2006 | Zhon et al. |
| 2007/0080507 A1 | 4/2007 | Aeberhard et al. |
| 2007/0137875 A1 | 6/2007 | Spielmann |
| 2008/0090504 A1 * | 4/2008 | Trautner et al. ............. 451/359 |
| 2008/0265695 A1 * | 10/2008 | Yoshida et al. ................ 310/50 |

| | | |
|---|---|---|
| 2008/0296036 A1 | 12/2008 | Simm et al. |
| 2009/0021090 A1 * | 1/2009 | Du et al. .................. 310/50 |

FOREIGN PATENT DOCUMENTS

| | | |
|---|---|---|
| DE | 677216 | 6/1939 |
| DE | 1893786 | 5/1964 |
| DE | 6925128 | 10/1969 |
| DE | 1935308 | 1/1970 |
| DE | 6948878 U | 5/1970 |
| DE | 2 029 614 | 6/1970 |
| DE | 2129771 | 12/1972 |
| DE | 25 11 469 | 3/1975 |
| DE | 25 11 469 | 9/1976 |
| DE | 2522446 | 12/1976 |
| DE | 27 51 506 | 5/1979 |
| DE | 28 30 511 | 1/1980 |
| DE | 30 41 009 | 10/1980 |
| DE | 2914883 | 10/1980 |
| DE | 2918415 | 11/1980 |
| DE | 2931520 | 2/1981 |
| DE | 2941356 | 4/1981 |
| DE | 30 41 994 | 5/1982 |
| DE | 32 39 985 | 10/1982 |
| DE | 81 02 453 | 10/1982 |
| DE | 3136149 | 3/1983 |
| DE | 31 47 501 | 6/1983 |
| DE | 32 15 734 | 11/1983 |
| DE | 33 16 111 | 11/1983 |
| DE | 83 19 187 | 11/1983 |
| DE | 32 20 795 | 12/1983 |
| DE | 3220795 | 12/1983 |
| DE | 3240530 | 5/1984 |
| DE | 3318199 | 11/1984 |
| DE | 33 24 333 | 1/1985 |
| DE | 3340799 | 5/1985 |
| DE | 34 30 023 | 2/1986 |
| DE | 34 36 220 | 4/1986 |
| DE | 3614511 | 11/1986 |
| DE | 3527971 | 3/1987 |
| DE | 3610671 | 10/1987 |
| DE | 8436584 | 12/1987 |
| DE | 3636301 | 4/1988 |
| DE | 36 43 422 | 6/1988 |
| DE | 90 16 415 | 9/1991 |
| DE | 30 18 633 | 11/1991 |
| DE | 40 16 593 | 11/1991 |
| DE | 4211316 | 10/1993 |
| DE | 42 25 157 | 2/1994 |
| DE | 43 05 965 | 9/1994 |
| DE | 44 06 841 | 4/1995 |
| DE | 4334933 | 4/1995 |
| DE | 4401664 | 7/1995 |
| DE | 196 21 090 | 12/1996 |
| DE | 195 28 924 | 2/1997 |
| DE | 297 01 358 | 5/1997 |
| DE | 297 03 469 | 6/1997 |
| DE | 19715016 | 10/1998 |
| DE | 197 53 304 | 6/1999 |
| DE | 19803454 | 8/1999 |
| DE | 19942271 | 9/1999 |
| DE | 100 06 641 | 9/2000 |
| DE | 19908300 | 9/2000 |
| DE | 10060635 | 7/2001 |
| DE | 100 37 808 | 2/2002 |
| DE | 201 14 999 | 2/2002 |
| DE | 20102674 | 8/2002 |
| DE | 10228452 | 1/2004 |
| DE | 102 40 361 | 3/2004 |
| DE | 102 58 605 | 7/2004 |
| DE | 102 59 372 | 7/2004 |
| DE | 10337260 | 3/2005 |
| DE | 103 36 637 | 4/2005 |
| DE | 103 46 534 | 5/2005 |
| DE | 10358032 | 7/2005 |
| DE | 102004003711 | 8/2005 |
| DE | 20 2005 015 311 | 1/2006 |
| DE | 10 2004 052 329 | 5/2006 |
| DE | 102004027635 | 6/2006 |
| DE | 10 2005 041 447 | 3/2007 |
| DE | 10 2006 009 922 | 9/2007 |
| EP | 0018626 | 11/1980 |
| EP | 0023233 | 2/1981 |
| EP | 0031433 | 7/1981 |
| EP | 0031867 | 7/1981 |
| EP | 0040261 | 11/1981 |
| EP | 094281 | 11/1983 |
| EP | 0302229 | 2/1989 |
| EP | 0 399 714 | 11/1990 |
| EP | 0416612 | 3/1991 |
| EP | 0 463 416 | 6/1991 |
| EP | 0 566 926 | 10/1993 |
| EP | 0600854 | 6/1994 |
| EP | 0612588 | 8/1994 |
| EP | 0 345 896 | 9/1994 |
| EP | 0613758 | 9/1994 |
| EP | 0 623 427 | 11/1994 |
| EP | 0698449 | 2/1996 |
| EP | 0 706 861 | 4/1996 |
| EP | 0716896 | 6/1996 |
| EP | 0734116 | 9/1996 |
| EP | 792 724 | 1/1997 |
| EP | 0755755 | 1/1997 |
| EP | 0 761 350 | 3/1997 |
| EP | 0775555 | 5/1997 |
| EP | 0 794 038 | 9/1997 |
| EP | 0792723 | 9/1997 |
| EP | 0792724 | 9/1997 |
| EP | 0808011 | 11/1997 |
| EP | 0856383 | 8/1998 |
| EP | 0905850 | 3/1999 |
| EP | 0909614 | 4/1999 |
| EP | 1083029 | 3/2001 |
| EP | 1 114 700 | 7/2001 |
| EP | 1364752 | 11/2003 |
| EP | 1 413 402 | 4/2004 |
| EP | 1477280 | 11/2004 |
| EP | 1 481 768 | 12/2004 |
| EP | 1506846 | 2/2005 |
| EP | 1207982 | 3/2005 |
| EP | 1 555 091 | 7/2005 |
| EP | 1555091 | 7/2005 |
| EP | 1 563 960 | 8/2005 |
| EP | 1598151 | 11/2005 |
| EP | 1 637 290 | 3/2006 |
| EP | 1 652 630 | 5/2006 |
| EP | 1 655 110 | 5/2006 |
| EP | 1652630 | 5/2006 |
| EP | 1250217 | 6/2006 |
| EP | 1666905 | 6/2006 |
| EP | 1 690 637 | 8/2006 |
| EP | 1 695 796 | 8/2006 |
| EP | 1 716 951 | 11/2006 |
| FR | 2 526 348 | 11/1983 |
| GB | 1 315 904 | 5/1973 |
| GB | 1438571 | 8/1973 |
| GB | 2085345 | 4/1982 |
| GB | 2109739 | 6/1983 |
| GB | 2115337 | 9/1983 |
| GB | 2283378 | 5/1995 |
| GB | 2285003 | 6/1995 |
| GB | 2 285 764 | 7/1995 |
| GB | 2285764 | 7/1995 |
| GB | 2327054 | 1/1999 |
| GB | 2 334 911 | 9/1999 |
| GB | 2353243 | 2/2001 |

| | | |
|---|---|---|
| GB | 2404891 | 2/2005 |
| GB | 2413105 | 10/2005 |
| GB | 2415656 | 1/2006 |
| GB | 2420522 | 5/2006 |
| JP | 59-124507 | 7/1984 |
| JP | 60076913 | 5/1985 |
| JP | 61-131807 | 6/1986 |
| JP | 62182725 | 8/1987 |
| JP | 62-10507 | 8/1994 |
| JP | 7040257 | 2/1995 |
| JP | 09-011158 | 1/1997 |
| JP | 9109044 | 4/1997 |
| JP | 11-267937 | 10/1999 |
| JP | D1059635 | 2/2000 |
| JP | D996941 | 11/2000 |
| JP | D1092226 | 11/2000 |
| JP | D1109601 | 5/2001 |
| JP | 2002144210 | 5/2002 |
| JP | 2002-254356 | 9/2002 |
| JP | D1158192 | 11/2002 |
| JP | D1172513 | 5/2003 |
| JP | D1238857 | 5/2005 |
| JP | D1255291 | 11/2005 |
| WO | WO 93/15863 | 8/1993 |
| WO | WO 95/00288 | 1/1995 |
| WO | WO 95/01240 | 1/1995 |
| WO | WO 96/08065 | 3/1996 |
| WO | WO 96/19677 | 6/1996 |
| WO | WO 97/27020 | 7/1997 |
| WO | WO 98/05457 | 2/1998 |
| WO | WO 99/04933 | 2/1999 |
| WO | WO 99/10132 | 3/1999 |
| WO | WO 99/53804 | 10/1999 |
| WO | WO 03/033203 | 4/2003 |
| WO | WO 2005/011904 | 2/2005 |
| WO | WO 2005/040627 | 5/2005 |
| WO | 2007/101735 | 9/2007 |

OTHER PUBLICATIONS

Extended European Search Report EP Patent Application No. 08169590.0 corresponding to U.S. Appl. No. 11/986,687 dated Mar. 16, 2009 (citing CH546615, DE8436584, EP0040261 and WO2007/101735).

Extended European Search Report EP Patent Application No. 08169623.9 corresponding to U.S. Appl. No. 11/986,686 dated Mar. 25, 2009 (citing DE 102006009922, EP1695796, EP1652630, GB2285764, US5004054, US5343961, and US6868919).

Extended European Search Report EP Patent Application No. 0816595.9 corresponding to U.S. Appl. No. 11/986,688 dated Mar. 30, 2009 (citing DE2029614, DE2511469, DE2830511, FR2526348, GB2285764, US3998278, US4158313, and US5004054).

Non-Final Office Action, copending U.S. Appl. No. 11/986,678, mailed Jul. 23, 2009.

Non-Final Office Action, copending U.S. Appl. No. 11/986,678, mailed Jan. 14, 2009.

Non-Final Office Action, copending U.S. Appl. No. 11/986,685, mailed May 27, 2009.

Non-Final Office Action in copending U.S. Appl. No. 11/986,686, mailed Sep. 17, 2009.

Non-Final Office Action in copending U.S. Appl. No. 11/986,687, mailed Oct. 16, 2009.

Final Office Action in copending U.S. Appl. No. 11/986,688, mailed Dec. 30, 2009.

Final Office Action in copending U.S. Appl. No. 11/986,669, mailed Feb. 3, 2010.

European Search Report for corresponding EP Application No. 8169624.7 dated Mar. 10, 2010.

Extended European Search Report for corresponding EP Application No. 8169624.7.

* cited by examiner

MID-HANDLE DRILL CONSTRUCTION AND ASSEMBLY PROCESS

FIELD

The present disclosure relates generally to power tools such as drills, screwdrivers, and hammer mechanisms, and more particularly to a power tool having a mid-handle grip housing and an assembly process for the same.

BACKGROUND

The statements in this section merely provide background information related to the present disclosure and may not constitute prior art.

A common problem with power tools, particularly portable power tools of the mid-handle configuration having a "jam-pot" construction, concerns the ability with which a power tool so constructed may be assembled. Typically, power tools having a jam-pot construction may be assembled in a process wherein the subcomponents which form the wiring are initially installed into a first jam-pot opening and thereafter, the subcomponents may be fed out through a second jam-pot opening.

An often and time-consuming operation in this process concerns the connection of the wires from a power source such as a cord or a battery pack to the trigger switch and motor assembly. In a mid-handle tool, the connection of these wires can require that the tool be reoriented multiple times. The assembly operation may be such that the wires are routed through narrow openings in the housing to later be connected to the field and brushes. The tool may need to be reoriented to make these connections. Additionally, lead wires may be prone to being trapped or pinched between the housing components during the assembly process.

In addition, portable power tools of the mid-handle configuration having a "jam-pot" construction are generally complex to mold. For example, the jam-pot is typically molded with at least a portion of the handle attached thereto. This typically requires the use of multiple additional components such as a housing end cap and a separate handle housing portion.

SUMMARY

A power tool is provided including a gear case, a motor having at least one set of lead wires, a housing assembly, and a field case. The field case may include a front portion configured for engaging the gear case and a rear portion. The housing assembly may include first and second generally symmetrical housing segments configured for engaging the field case and forming a mid-handle grip. At least one set of lead wires may be routed through the front portion of the field case to a trigger switch assembly.

In another aspect, the present teachings provides a power tool housing assembly comprising a base housing segment and a cover housing segment generally symmetrical to the base housing segment. Each housing segment may include a plurality of assembly bosses defining a respective plurality of apertures accessible from an exterior of the housing assembly. A field case may be provided having at least one fastening boss defining an aperture accessible from an interior of the housing assembly and configured for attaching the field case to an interior of the base housing segment. The field case, base housing segment, and cover housing segment cooperate to form a housing assembly. In various embodiments, the housing assembly may include an end cap and a mid-handle grip integrally connected via a bridge section having a longitudinal parting line.

In yet another aspect, the present teachings provide a power tool comprising a motor, a field case, a self contained gear case assembly, and a housing assembly. The field case has a front portion for engaging the gear case assembly and a rear portion. The field case may define a generally cylindrical chamber for receiving the motor. The gear case assembly may include a metal gear case and a cover plate, wherein the cover plate is secured to the gear case and is not removably accessible from an exterior of the power tool. The housing assembly may be partially defined by the field case and include first and second generally symmetrical housing segments forming a mid-handle grip and configured for engaging the field case and gear case.

The present teachings further provide a method of assembling a mid-handle power tool. The method includes providing a housing assembly having first and second generally symmetrical housing segments. In various embodiments, the housing assembly forms an end cap and a mid-handle grip connected by a bridge section. At least one set of lead wires may be connected to a motor. The wires can be routed to the front portion of a field case while the motor is pressed into the field case from the front portion. The field case defines a generally cylindrical chamber for receiving the motor and is attached to a gear case and the first housing segment. The second housing segment can be attached to the field case and the first housing segment.

According to one example, a combined gear case housing assembly is created by coupling a gear case cover to a gear case housing using cooperating attachment features located inside an outer radial periphery of the gear case housing. A field case assembly is coupled to the combined gear case housing assembly using cooperating attachment features located outside an outer radial periphery of the gear case housing. A pair of clamshell housing elements is coupled to the field case assembly to each other forming a mid-handle grip. Each of the gear case housing, the field case assembly, and the pair of clamshell elements forms a part of a final exterior housing the mid-handle power tool.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
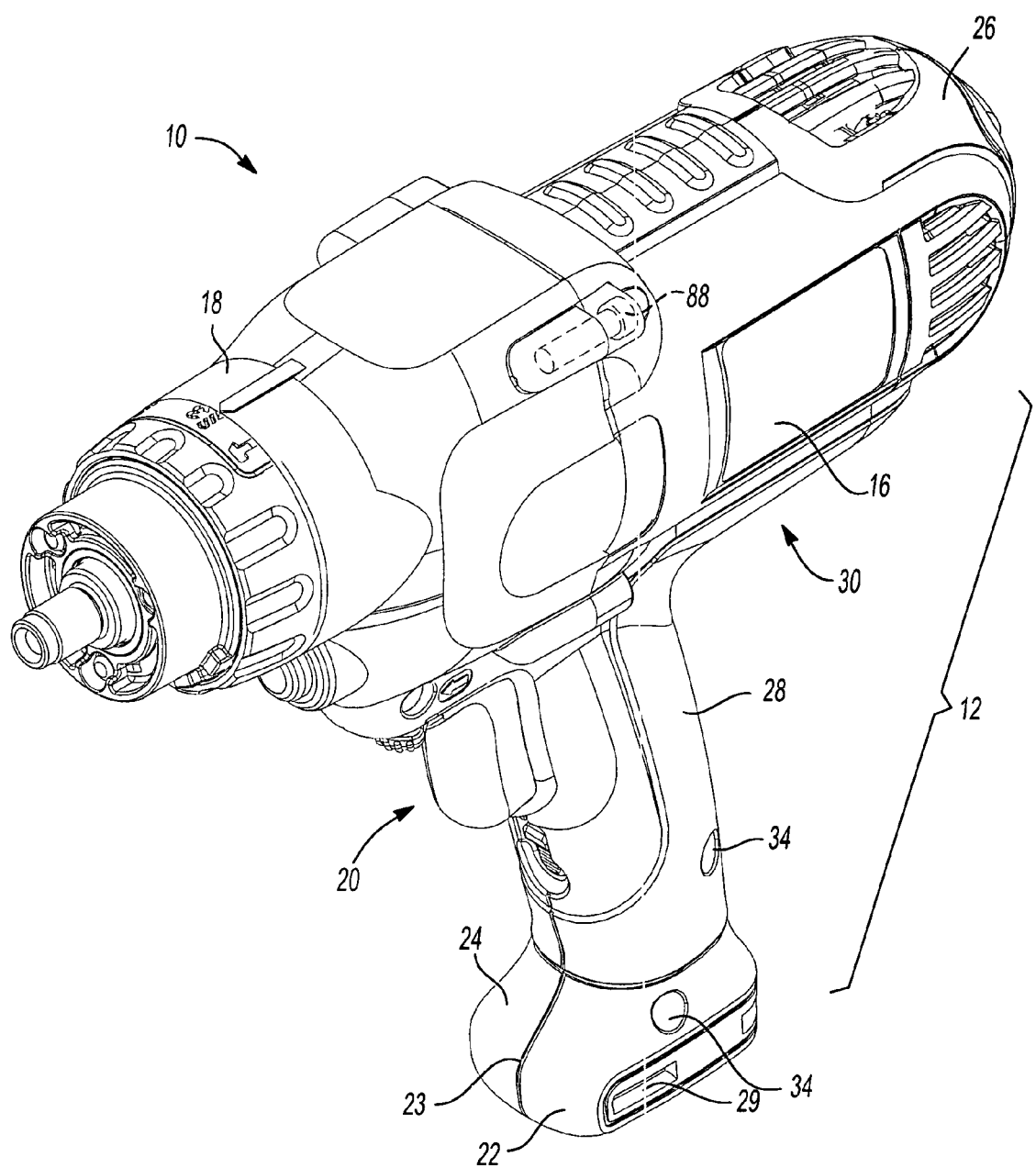
FIG. 1 is side perspective view of an assembled exemplary power tool constructed in accordance with the teachings of the present.

The following description is merely exemplary in nature and is not intended to limit the present disclosure, application, or uses. It should be understood that throughout the drawings, corresponding reference numerals indicate like or corresponding parts and features.

With reference to FIGS. 1 through 8 of the drawings, a power tool constructed in accordance with the present teachings is generally indicated by reference numeral 10. As those skilled in the art will appreciate, various embodiments of the power tool of the present disclosure may be either a corded or cordless (battery operated) device, such as a portable screwdriver, drill, impact wrench-type power tool, hammer drill, and other mid-handle type power tools.

In the particular embodiments illustrated herein, the power tool 10 is a corded drill having a two component clam shell housing assembly 12 having a longitudinal part line 23. The power tool 10 is provided with a motor assembly 14, a field case 16 configured to house the motor assembly 14, a gear case 18 having a gear assembly, a trigger switch assembly 20, and a power cord (not shown).

Those skilled in the art will understand that several of the components of power tool 10, such as the motor assembly 14, gear assembly, chuck, and trigger details, may be conventional in nature and need not be described in significant detail in this application. Reference may be made to a variety of publications for a more complete understanding of the operation of the conventional features of power tool 10. One example of such publications is commonly assigned U.S. Pat. No. 5,897,454 issued Apr. 27, 1999, the disclosure of which is hereby incorporated by reference as if fully set forth herein.

The power tool housing assembly 12 of the present disclosure can be formed from first and second housing segments 22, 24, such as clam shell-type halves, and a plurality of fasteners, such as screws. Each of the first and second segments 22, 24 can be generally symmetrical and include cooperating halves of an end cap 26 and a mid-handle grip 28 separated by an integral bridge section 30 extending there between. The first and second segments 22, 24 are joined together along a longitudinal parting line 23. In various embodiments, the field case 16 can form at least a portion of the exterior surface of the power tool 10. The housing segments, 22, 24 can be formed from injection molded plastic or a similarly suitable material and may be referred to individually herein as a base housing segment 22 and a cover housing segment 24. It should be understood that while the present disclosure may refer to certain features, elements, or parts in a dimensional respect, such reference is not meant to be limiting, and it is envisioned that elements such as the base housing segment and cover housing segment may, in certain instances, be interchangeable with one another.

The fastening devices, or screws, that typically secure clam shell-type housing halves together can go through both housing segments, and in some cases can go additionally through a boss on the field case. According to the present disclosure, each housing segment 22, 24 can have an interior surface 22a, 24a and exterior surface 22b, 24b and may include a plurality of assembly screw bosses 32 laterally disposed throughout the end cap 26 region, the mid-handle grip 28, and the bridge section 30. Each assembly boss 32 can have an aperture 34 for receiving a suitable threaded fastener configured to secure the power tool housing assembly 12 together. The apertures 34 can be accessible from the exterior of either of the housing segments 22, 24.

At least one of the housing segments, such as the base housing segment 22, can include at least one intermediate fastening boss 36. The intermediate fastening boss 36 may define an aperture 38 accessible from an interior of the base housing segment 22 and is configured for attaching the field case 16 to an interior surface 22a of the base housing segment 22. In certain embodiments, the intermediate fastening boss 36 may not be accessible from an exterior of the power tool 10. As described in more detail below, by using the intermediate fastening boss 36 and separately fastening the field case 16 to the base housing segment 22 first, various wire leads may be routed within the housing assembly 12 and secured to certain areas such that when the cover housing segment 24 is attached to the base housing segment 22. In this respect, there is less opportunity for such wire leads to be pinched or compromised between various portions of the housing assembly 12.

Figure 8:
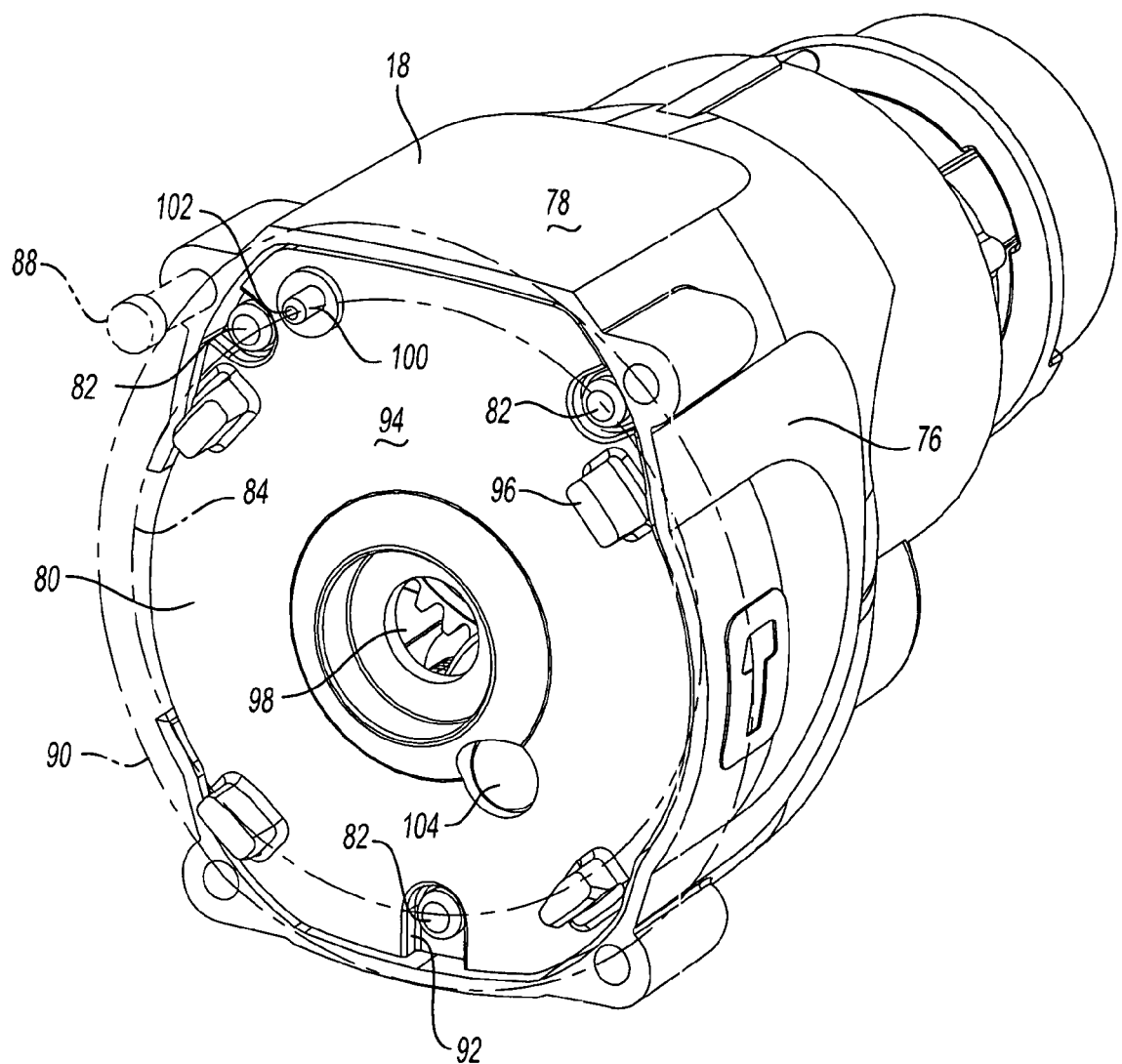
FIG. 8 is a partial perspective view of a gear case according to the present disclosure.

In one example, the motor assembly 14 can include a motor that is coupled to a typical output spindle and chuck by way of a gear assembly (details not shown). The gear assembly can be housed in a typical gear case assembly 18 and may simply be a shaft or transmission providing drive from the motor assembly 14 through a gear train. In certain embodiments, the power tool includes a self-contained gear case assembly that may include a gear case and a cover plate 80 secured thereto with internal fasteners 82 as best shown in FIG. 8. With such a design, the cover plate 80 is not removably accessible from an exterior of the power tool 10. For example, the gear case 18 would need to be detached from the field case 16 prior to removing the cover plate 80 since the cover plate fasteners would otherwise be concealed.

The gear case 18 includes a housing 76 that defines an outer surface 78. It is understood that the outer surface 78 of the gear case housing 76 partially defines the overall outer surface of the power tool 10. In other words, the outer surface 78 is exposed to allow a user to hold and grip the outer surface 78 during use of the power tool 10.

The cover plate 80 is coupled to the gear case housing 76 via a plurality of first fasteners 82. As shown in FIG. 8, the first fasteners 82 are arranged in a first pattern 84 (represented by a bolt circle in FIG. 8). The first fasteners 82 can be located within the periphery of the gear case housing 76 and can hold the cover plate 80 against a lip (not shown) within the gear case housing 76. In one embodiment, the gear case 18 includes a seal (not shown) between the gear case housing 76 and the cover plate 80, which reduces leakage of any lubricant (not shown) out of the gear case 18.

The gear case 18 and the field case are coupled via a plurality of second fasteners 88 (FIG. 1). In the embodiment represented in FIG. 8, the second fasteners 88 are arranged in a second pattern 90 (represented by a bolt circle in FIG. 8). As shown, the second pattern 90 of the second fasteners 88 has a larger periphery than the first pattern 84 of the first fasteners 82. In other words, the second fasteners 88 are further outboard than the first fasteners 82. Thus, when the gear case 18 and the field case 16 are coupled, they cooperate to enclose the first fasteners 82.

Also, in the embodiment shown, the cover plate 80 can include a plurality of pockets 92. The pockets 92 can be provided such that the heads of the first fasteners 82 are disposed beneath an outer surface 94 of the cover plate 80. As such, the first fasteners 82 are unlikely to interfere with the coupling of the gear case 18 and field case 16.

The cover plate 80 may also include a plurality of projections 96 that extend from the outer surface 94. The projections 96 extend into the field case 16 to ensure proper orientation of the gear case 18. The cover plate 80 may further include a first aperture 98 for an output member (not shown) of the motor assembly 14 that may extend there through.

In various embodiments, the motor assembly 14 can be housed in a field case 16. A typical power cord can supply current from an AC source to the motor assembly 14 and can be controlled by the trigger switch assembly 20. The motor assembly 14 may include a first set of lead wires 40 routed from the motor field to the trigger switch assembly 20 and a second set of wire leads 42 routed from the commutator brushes (not shown) to the trigger switch assembly 20.

The field case 16 may be made of a non-metallic material, such as injection molded plastic, and may define a generally cylindrical interior chamber 44 for receiving the motor 14. The field case 16 may have a front portion 46 for engaging the gear case 18 and a rear portion 48, at least a portion of which may be covered by the end cap 26. The front portion 46 may include one or more laterally extending bosses 50 configured for securing the field case 16 to the gear case 18 via fastening devices. The fastening devices can be screws extending through the apertures of bosses 50 and mating with cooperating threads provided in a metal gear case 18. In various embodiments, the field case 16 may form a part of the exterior housing of the power tool 10.

Figure 5:
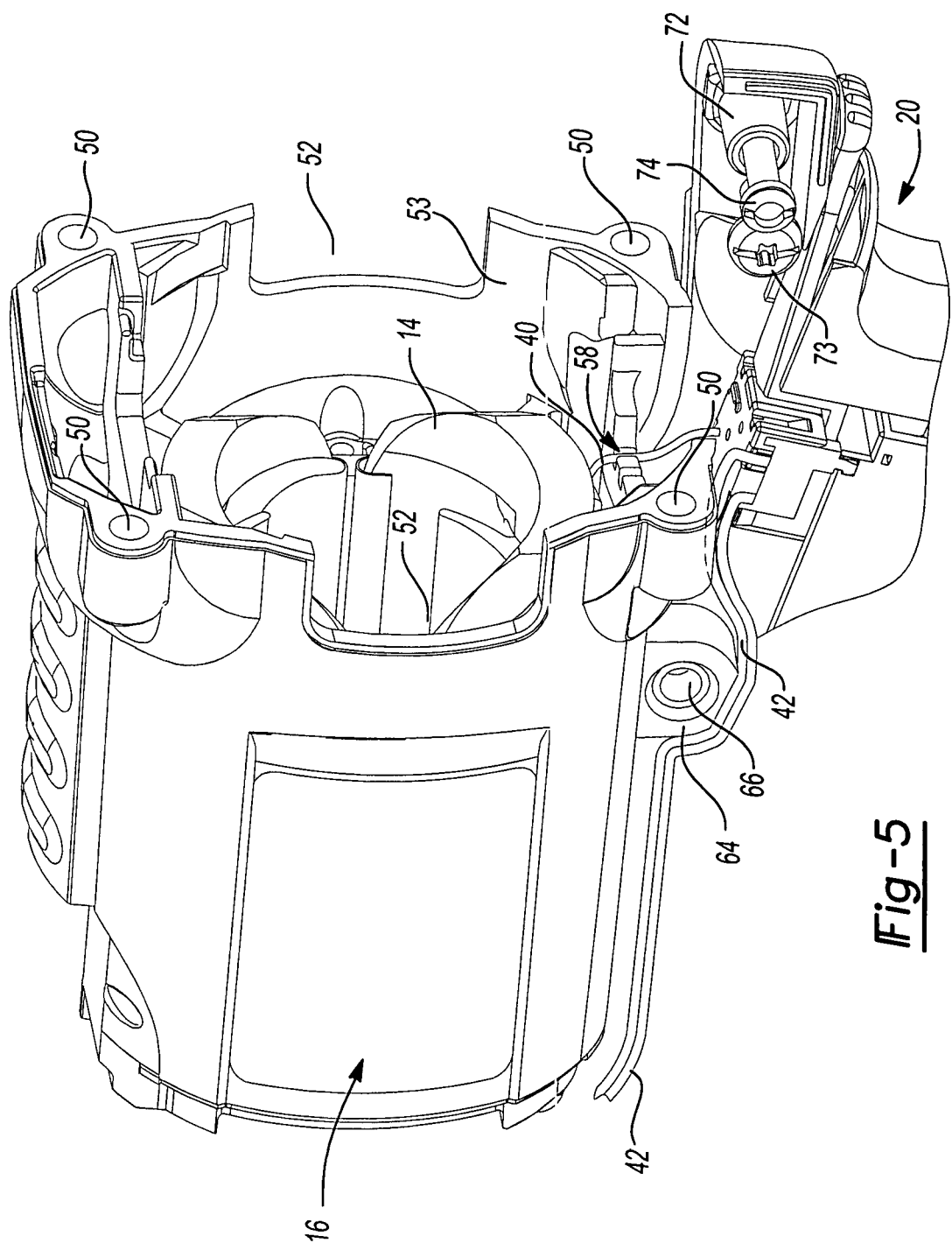
FIG. 5 is a perspective view of a field case according to the present disclosure.
Figure 6:
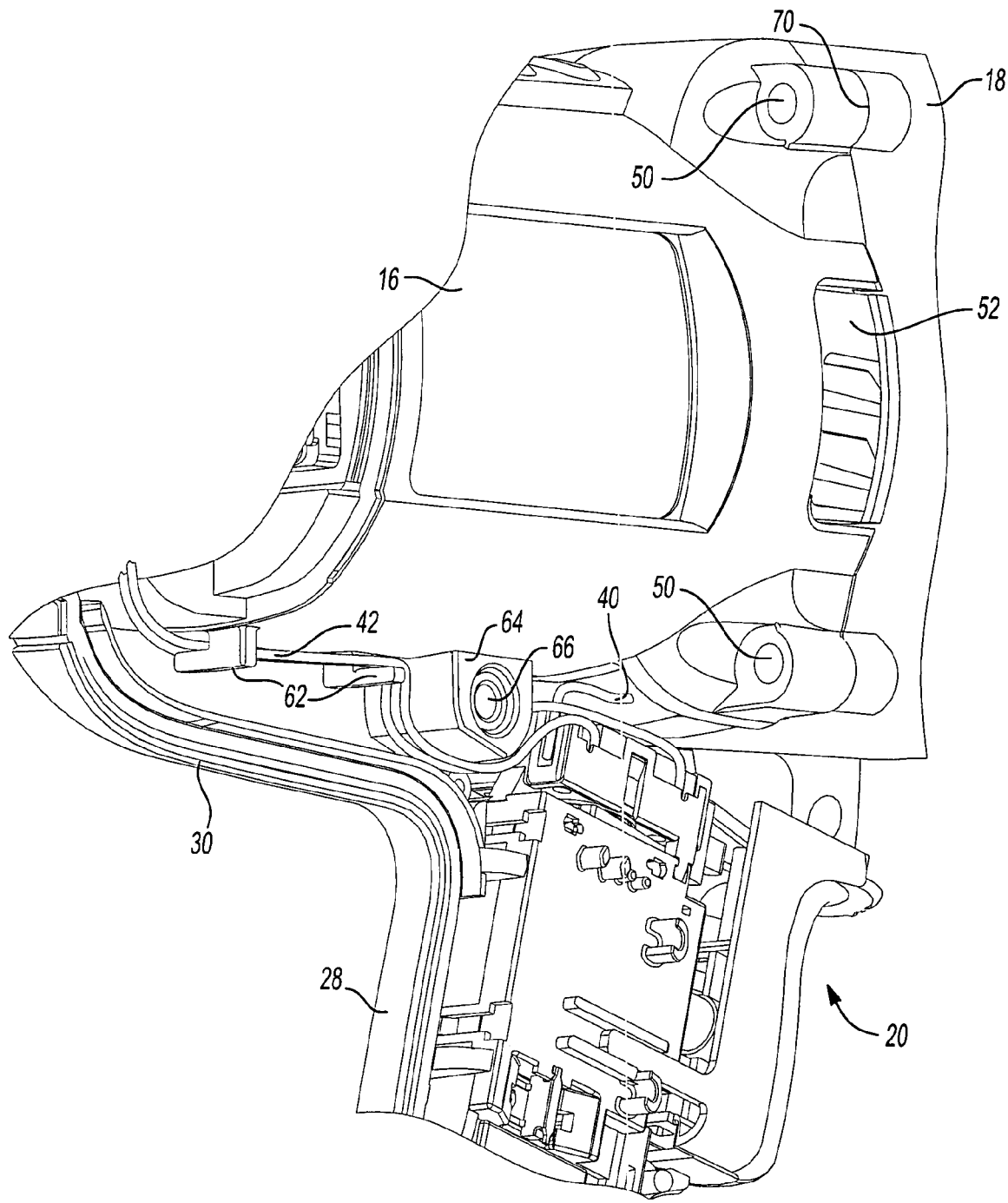
FIG. 6 is an alternate perspective view of a field case according to the present disclosure.

As best shown in FIG. 5, the field case 16 may define one or more venting apertures 52 formed within the front portion 46. In the assembled power tool 10, the apertures 52 partially define a venting path to provide fluid communication between the exterior of the housing assembly 12 and the interior of the power tool 10, including an interior area of the mid-handle grip 28. The venting path is configured to allow the passage of intake or exhaust air flow there through. In various embodiments, the housing assembly 12 may further be provided with one or more apertures, or slots, to additionally allow for air to either be taken in or exhausted, depending on the location of the slots and placement of an armature fan unit, through the mid-handle 28 via vents 29 therein. In this way cooling airflow can be provided over the switch 20 located in the midhandle 28. Additional venting apertures, or slots, can be located in the parts of the clam shell halves 22, 24 that form the end cap 26.

Figure 2:
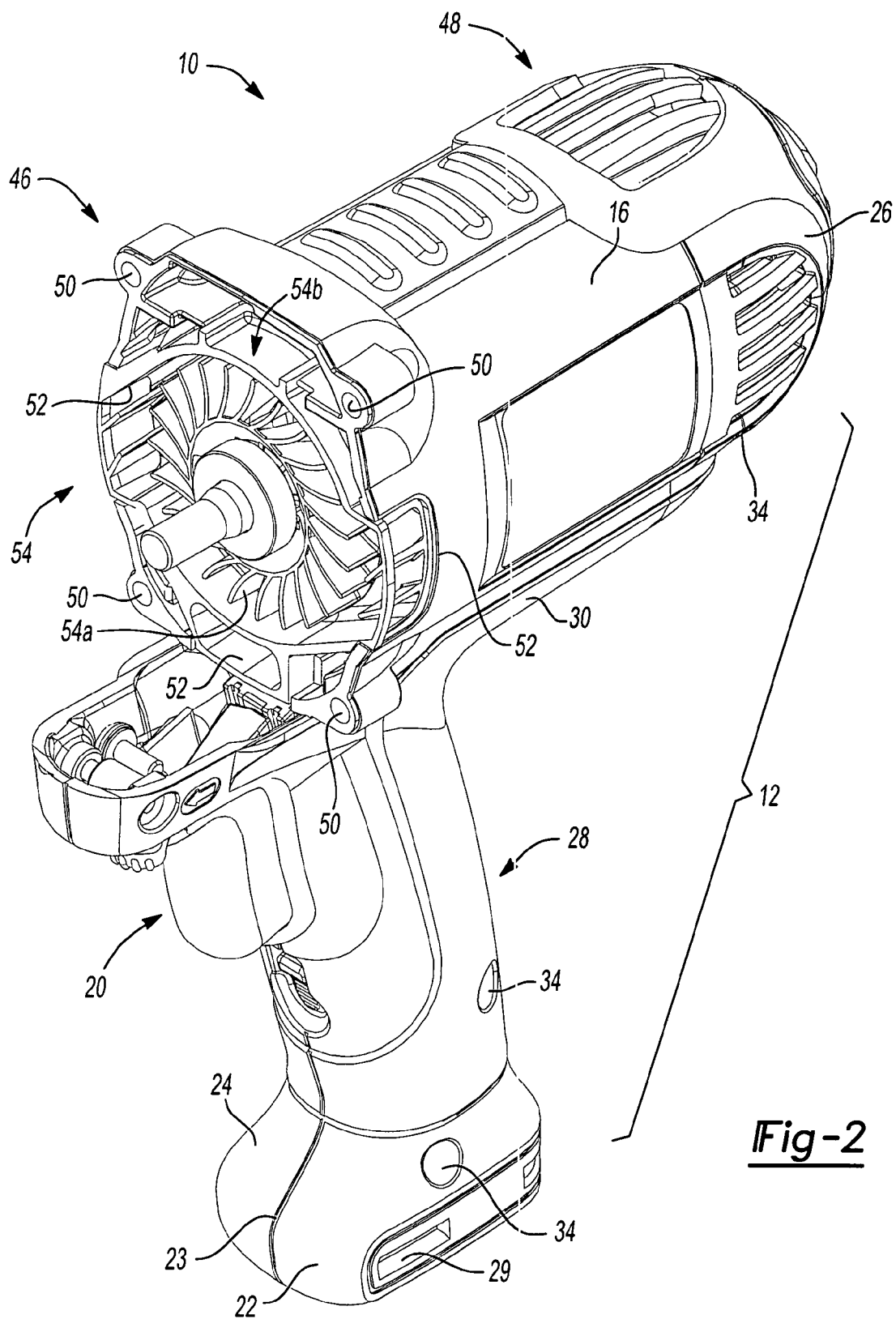
FIG. 2 is a partial perspective view of the power tool as illustrated in FIG. 1.

As shown in FIGS. 2 and 5, the field case 16 may be provided with a suitable recessed area 53 configured to house an armature fan unit 54. The fan unit 54 can include a fan member 54a and a baffle 54b and may serve to vent the motor 14, the gear case 18, or both. Additionally, the fan unit 54 may be used to aid in cooling of the trigger switch assembly 20 and its electronics that may be located within an interior 56 of the mid-handle grip 28. For example, such an intake or exhaust configuration may create an air flow that can be directed via vents 29 to pass through the interior 56 of the mid-handle grip 28 and over the internal portion of the trigger switch assembly 20, which may often be a heat sink. This would allow the trigger switch assembly 20 to be adequately cooled or maintained at a suitable operating temperature.

In various embodiments, the present disclosure provides a simplified method for wiring a trigger switch assembly 20 in a mid-handle power tool 10. Once a first set of lead wires 40, or field wires, is connected to the motor 14, the field wires 40 can be folded or routed to a front portion 46 of the field case 16 while the motor 14 is being press fitted therein. In this manner, the wires would not have to be fished out from the back of the assembly. The field wires 40 may be routed out of a front end of the field case 16 and through the lowermost venting aperture 52, and past the fan unit 54 area. In certain embodiments as best shown in FIG. 5, the field case 16 may comprise one or more retaining slots 58 adjacent a venting aperture 52. In particular, once past the fan recessed area 52, the field wires 40 exit out the bottom of the field case 16 through the retaining slots 58 and connect to the trigger switch assembly 20. In certain embodiments, the fan 54, and in particular the fan baffle 54B, can be juxtaposed to the retaining slots 58 and positioned to secure the field wires 40 within the retaining slots 58. This type of wire routing enables the use of shorter wires, leading to cost savings and ease of manufacturing.

As one skilled in the art can appreciate, routing the field wires 40 through a ventilation path may allow for a more compact power tool housing design, for example, by minimizing additional separate space necessary in the housing assembly used for wiring purposes. This design is also less prone for pinching or compromising a wire during the assembly process. In certain aspects, the field wires may be attached to the trigger switch assembly 20 prior to pressing the motor 14 into the field case 16.

Figure 4:
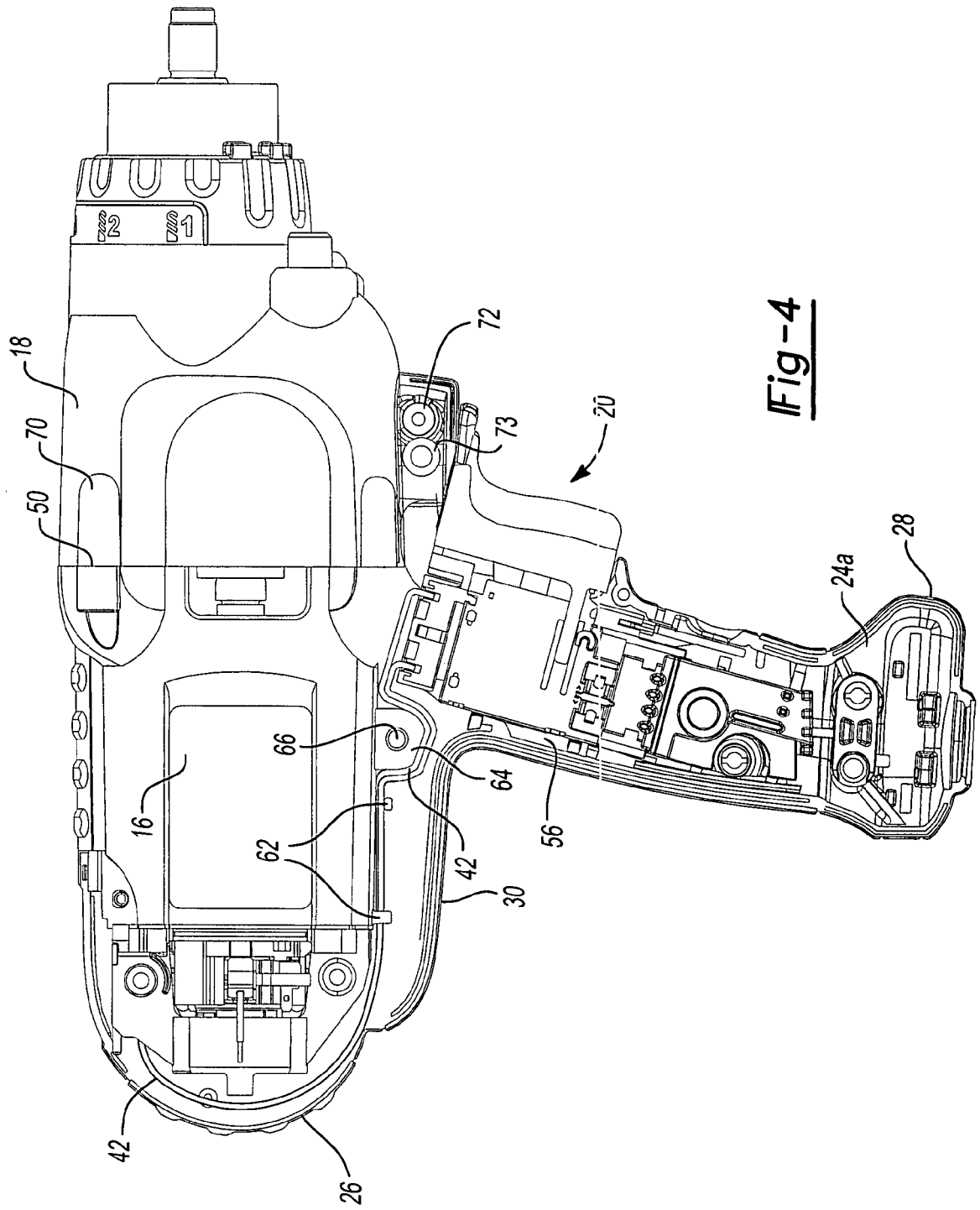
FIG. 4 is a side plan view of the power tool of FIG. 1 with the cover housing segment removed.
Figure 7A:
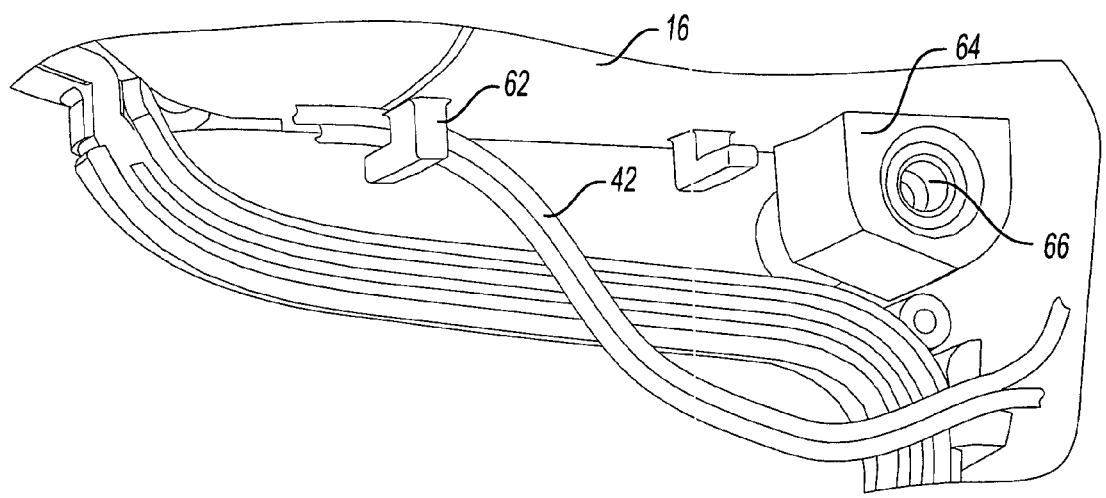
FIGS. 7A and 7B are partial magnified views of FIG. 6.
Figure 7B:
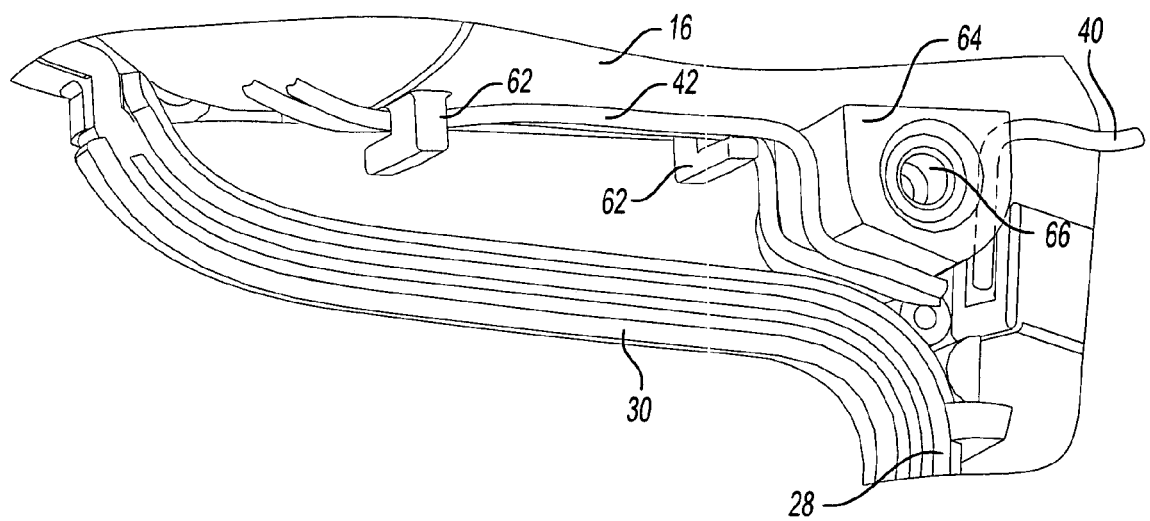

The present disclosure also provides a method of securing lead wires within the housing assembly 12. As shown in FIGS. 4-8, a second set of lead wires 42, or brush leads, may be attached to the motor and are routed through a rear portion 48 of the field case 16 to commutator brushes (not shown). Such lead wires 42 may be attached prior to assembly of the motor 14 into the field case 16 or after the insertion of the motor 14. The brush leads 42 may continue through the bridge section 30 of the housing assembly 12 and are routed to the trigger switch assembly 20. In certain aspects, as best shown in FIGS. 7A and 7B, the field case may include one or more wire retention members 62 configured for securing the brush wires 42 in the bridge section 30. For example, the wire retention members 62 may extend from, and be integrally formed with, a lower region of the field case 16. As shown in FIG. 4, in various embodiments, this second set of lead wires is routed during an intermediate assembly stage, in particular, after the base housing segment 22 is attached to the field case 16 and prior to the cover housing segment 24 being attached.

In other embodiments, the bridge section 30 of at least one of the base housing segment 22 and the cover housing segment 24 may be provided with similar wire retention members 62. It is envisioned that if two or more wire retention members are used, they may be orientated in alternating directions so as to better retain the brush wires 42. The bridge section 30 of at least one of the base housing segment 22 and the cover housing segment 24 may be provided with wire retention members 62 in the form of extending webs or rib sections (not shown) that provide structural support to the bridge section 30 and may improve the integrity of the housing assembly 12 when high torque is applied to the power tool 10. Alternatively, such extending webs or rib sections (not shown) may be provided independent of the wire retention members 62.

In various embodiments of the present disclosure, the field case 16 may include at least one assembly boss 64 defining an aperture 66 configured for cooperating with the base housing segment 22 intermediate fastening boss 36 for attaching the field case 16 to an interior 22a of the base housing segment 22. A fastening member can be used to engage each of the base housing segment 22, cover housing segment 24, and field case 16 to secure the housing assembly 12. The field case 16 may be mounted to the base housing segment 22 as a separate step. Once secure, other parts may be attached in place, such as the trigger switch assembly 20, and the lead wires 40, 42 can be routed accordingly. The lead wires 40, 42 can be held in place through the bridge section 30 by the wire retention members 62. This can help prevent or eliminate the possibility of getting wires pinched between the housing segments 22, 24 and the field case 16.

As one skilled in the art can appreciate, a strong connection between the field case 16 and gear case 18 may minimize potential damage to the power tool 10 in the event of a sudden drop or other impact. Since the gear case 18 is typically aluminum or other metal, in certain embodiments the fastening devices, such as screws, are tapped into the gear case bosses 70 as opposed to the field case bosses 50, so that the,y may be held by stronger metallic threads. This may also increase the torque holding capability and the creep resistance of aluminum threads may result in a more consistent joining of the parts.

Figure 3A:
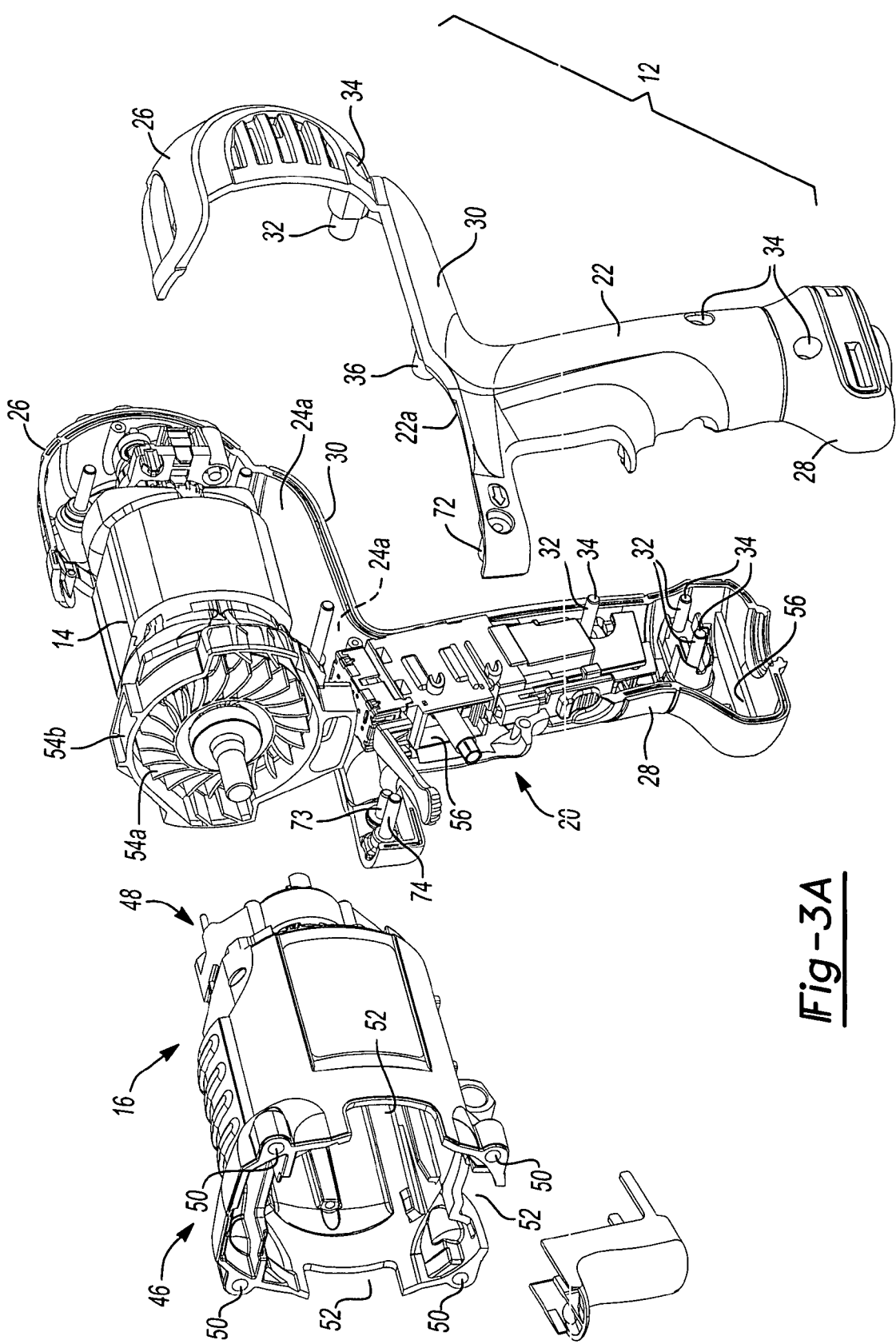
FIGS. 3a and 3b is are exploded views of the power tool as illustrated in FIG. 2.
Figure 3B:
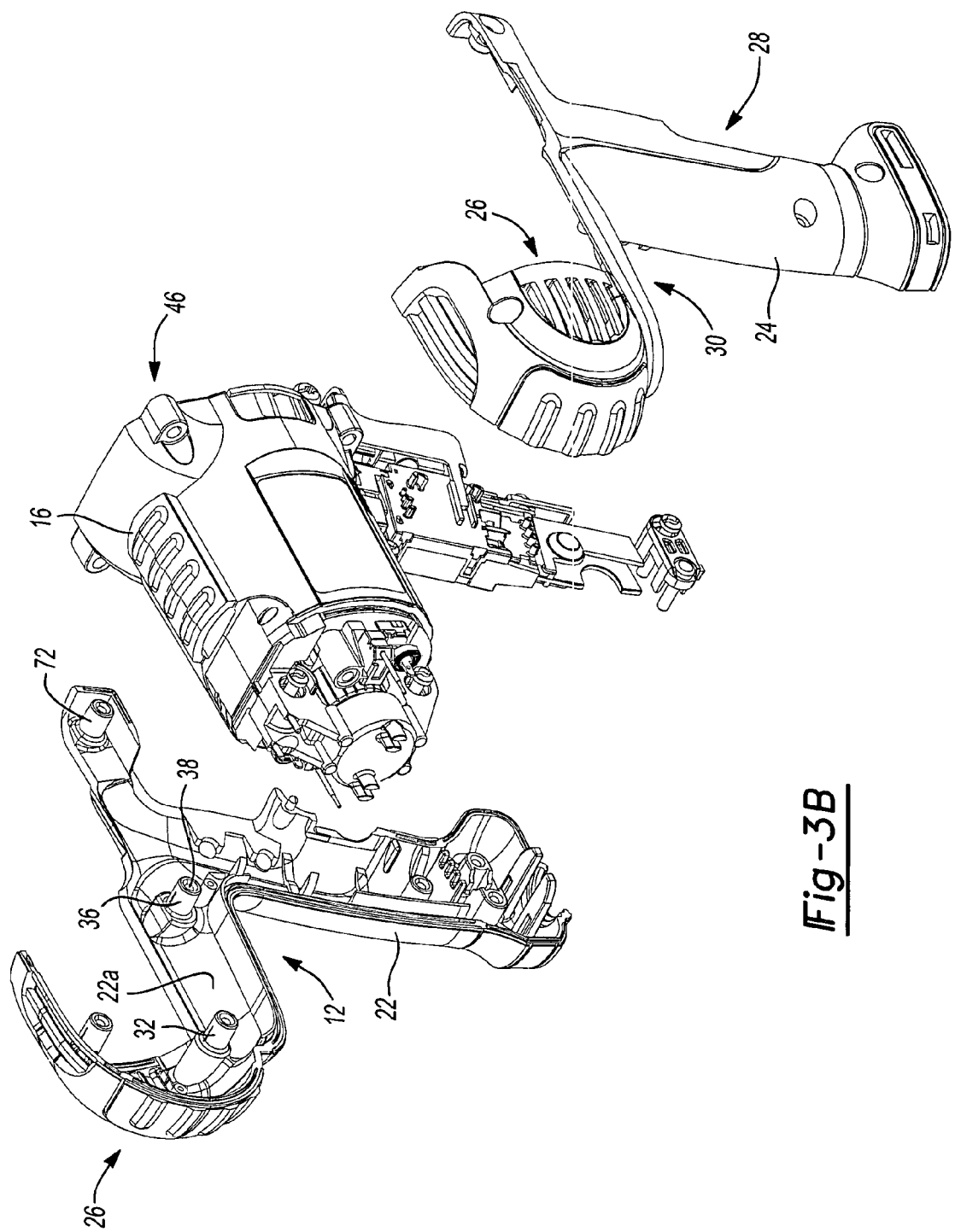

In various embodiments, a rear portion of the gear case 18 may include one or more protruding or longitudinally extending attachment member 72, such as a screw boss, that will cooperate with a fastening device to attach the gear case 18 to at least one of the first and second housing segments 22, 24. In this instance, at least one of the first and second housing segments 22, 24 may be provided with a cooperating attachment member 74 as shown in FIG. 3A. As shown, the cooperating attachment member is disposed a sufficient distance away from the mid-handle grip in order to couple the housing assembly 12 to the gear case 18. As shown in FIG. 3A, the attachment member is located at a distal end, in front of the mid-handle grip. Further mounting examples are also shown commonly assigned U.S. Pat. No. 6,446,734 issued Sep. 10, 2002, the disclosure of which is hereby incorporated by reference as if fully set forth herein.

According to one method of assembly, a combined gear case housing assembly 18 is created by coupling a gear case cover 80 to a gear case housing 76 using cooperating attachment features located inside an outer radial periphery of the gear case housing 76, as best illustrated in FIG. 8. In one example, this may include locating fasteners 82, such as screws, into cooperating threads located in an interior of the gear case housing 18 (as shown by a bolt circle 84 in FIG. 8). A field case assembly 16 may then be coupled to the combined gear case housing assembly 18 using cooperating attachment features, such as fasteners 88 and cooperating threads, located outside an outer radial periphery of the gear case housing 76 (as shown by a bolt circle 90 in FIG. 8).

The pair of clamshell housing elements 22, 24 is then coupled to the field case assembly 16 and then to each other, forming an integral mid-handle grip 28 and end cap 26. As shown in FIG. 1, each of the gear case housing 76, the field case assembly 16, and the pair of clamshell elements 22, 24 forms a part of a final exterior housing of the mid-handle power tool 10.

In certain embodiments, one of the pair of clamshell housing elements (the base housing segment 22) is coupled to the field case assembly 16 as an intermediate step. Thereafter, the other one of the pair of clamshell housing elements (the cover housing segment 24) is coupled to the field case assembly 16 and the base housing segment 22. According to the present disclosure, at least one set of lead wires 42 is retained adjacent to the field case 16 in the one of the pair of clamshell housing elements, in particular, the base housing segment 22, prior to coupling the other one of the pair of clamshell elements, or the cover housing segment 24. Each of the pair of clamshell housing elements 22, 24 may then be coupled to the gear case housing 76. In various embodiments, the steps of coupling each of the pair of clamshell housing elements 22, 24 to the gear case housing 76 and the step of coupling the coupling the pair of clamshell housing elements 22, 24 to each other occurs simultaneously.

Those skilled in the art will understand that in the normal operation and process of using such a power tool 10 according to the present disclosure, there is a risk of contact and damage that can accidentally be made with existing electrical conduit and the wires inside, or plumbing pipes. Mid-handle power tools, in particular, generally have their handle disposed close to the metallic gear cases. In certain instances, a barrier may be provided to prevent or minimize a user's fingers from contacting the gear case when a user's hands are in the normal operating position. However, if the integrity of such a barrier were to be compromised, the user may accidentally be subject to live electrical current if the power tool were to unexpectedly contact an electrical source. To reduce these risks, in various embodiments, the present disclosure provides a mid-handle power tool that is grounded. For example, a ground path may be provided such that a risk of the gear case becoming live if a drill bit touches a live wire is minimized. In one embodiment, as best shown in FIG. 5, the gear case 18 may include a ground lead extending there from for connection to a ground screw 73 (i.e., via a separate ground wire) that may be fastened to a boss disposed in one of the pair of clamshell housing elements 22, 24, wherein the ground screw 73 is, in turn, grounded to a power supply. In another embodiment, a connector may be provided (not shown) that has a ground terminal for a more direct electrical connection between the motor and a ground line. In these instances, the motor power device can be grounded when using a common corded power supply.

With the power tool housing design and assembly method of the present disclosure, the front routing of the field wires 40 and the securing of the brush wires 42 in the bridge section 30 simplifies the wire-up of the power tool 10. The assembly is simplified primarily because the field wires 40 are routed a shorter distance, and the brush wires 42 are able to be secured in place, minimizing assembly concerns that the wires may be pinched or compromised. In addition, the routing of the wires through ventilation paths eliminates the need for extra space within the housing. The specific clam shell-type housing including a base housing segment 22 and a cover housing segment 24 provides additional rigidity and integrity of the power tool 10.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless otherwise limited above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A power tool comprising:
   a gear case;
   a motor having a first and second set of lead wires;
   a field case defining a generally cylindrical chamber for receiving the motor, the field case having a front portion configured for engaging the gear case and a rear portion;
   a housing assembly partially defined by the field case and including first and second generally symmetrical housing segments configured for engaging the field case and forming a mid-handle grip, wherein the housing assembly defines an end cap surrounding the rear portion of the field case and the end cap is connected to the mid-handle grip via a bridge section; and
   a trigger switch assembly,
   wherein the first set of lead wires is routed through the front portion of the field case to the trigger switch assembly and the second set of lead wires is routed through the rear portion of the field case and through the bridge section to the trigger switch assembly.

2. A power tool according to claim 1, wherein the gear case comprises an extending attachment member and at least one of the first and second housing segments comprises a cooperating attachment member for coupling the housing assembly to the gear case.

3. A power tool according to claim 2, wherein the attachment member is located adjacent a rear portion of the gear case and the cooperating attachment member is located in an area of the housing assembly in front of the mid-handle grip.

4. A power tool according to claim 1, wherein the field case comprises at least one venting aperture in fluid communication with an interior of the mid-handle grip and configured to allow the intake or exhaust of air flow there through.

5. A power tool according to claim 4, wherein the first set of lead wires is routed from the motor through the venting aperture to the trigger switch assembly.

6. A power tool according to claim 4, further comprising a fan unit disposed in the field case and operable to vent at least one of the motor and the gear case, wherein the first set of lead wires is routed through a retaining slot adjacent the venting aperture and the fan unit is positioned to secure the lead wires in the retaining slot.

7. A power tool according to claim 1, wherein the gear case is grounded.

8. A power tool comprising:
   a motor;
   a self-contained gear case assembly comprising a metal gear case defining a cavity at one end, and a substantially planar cover plate;
   a field case defining a generally cylindrical chamber for receiving the motor, the field case having a front portion configured for engaging the gear case assembly and a rear portion; and
   a housing assembly partially defined by the field case and including first and second generally symmetrical housing segments forming a mid-handle grip and configured for engaging the field case and gear case;
   wherein the cover plate is secured to the gear case thereby closing the cavity and is not removably accessible from an exterior of the power tool.

9. A power tool according to claim 8, wherein the housing assembly includes an end cap and a mid-handle grip integrally connected via a bridge section, further wherein at least one of the first and second housing segments comprises an attachment member located in front of the mid-handle grip and configured to attach with the gear case.

10. A power tool according to claim 8, wherein the gear case comprises an extending attachment member and at least one of the first and second housing segments comprises a cooperating attachment member for coupling the housing assembly to the gear case.

11. A method of assembling a mid-handle power tool, comprising:
   providing a housing assembly having first and second generally symmetrical housing segments, the housing segments together defining an end cap and a mid-handle grip integrally joined by a bridge section;
   connecting a first set of lead wires to a motor;
   routing the first set of lead wires to the front portion of a field case while pressing the motor into the field case from the front portion;
   attaching a gear case to the field case;
   attaching the field case to the first housing segment; and
   attaching the second housing segment to the field case and the first housing segment.

12. A method according to claim 11, further comprising providing a ventilation path with fluid communication between an aperture in the field case and an interior of the mid-handle grip, and routing the first set of lead wires through the ventilation path and attaching the first set of lead wires to a trigger switch assembly.

13. A method according to claim 11, further comprising:
   connecting a second set of lead wires to the motor; and
   routing the second set of lead wires from the motor through a rear portion of the field case and along the bridge section of the first housing prior to attaching the second housing segment.

14. A method according to claim 13, further comprising securing the second set of lead wires in the bridge section by routing the lead wires around at least one wire retention member.

15. A method according to claim 11, wherein mounting the field case to the first housing segment comprises securing at least one fastening device through the field case and into the first housing segment.

16. A method according to claim 11, further comprising:
   providing the gear case with a protruding attachment member at a rear portion of the gear case;
   providing at least one of the first and second housing segments with a cooperating attachment member in front of the mid-handle grip; and
   connecting the gear case and at least one of the first and second housing segments together via the extending attachment member and the cooperating attachment member.

17. A method according to claim 11, further comprising attaching the first set of lead wires to a trigger switch prior to pressing the motor into the field case.

18. A power tool comprising:
   a gear case;
   a motor having a first set of lead wires;
   a field case defining a generally cylindrical chamber for receiving the motor, the field case having a front portion configured for engaging the gear case and a rear portion;
   a housing assembly partially defined by the field case and including first and second generally symmetrical housing segments configured for engaging the field case and forming a mid-handle grip;
   a trigger switch assembly; and
   a fan unit disposed in the field case and operable to vent at least one of the motor and the gear case, wherein the field case comprises at least one venting aperture in fluid communication with an interior of the mid-handle grip and configured to allow the intake or exhaust of air flow there through, further wherein the first set of lead wires is routed from the motor through the front portion of the field case and through a retaining slot adjacent the venting aperture to the trigger switch assembly and the fan unit is positioned to secure the lead wires in the retaining slot.

19. A method of assembling a mid-handle power tool, comprising:

provide a housing assembly having first and second generally symmetrical housing segments, each housing segment forming a portion of an end cap and a portion of a mid-handle grip integrally joined by a bridge section;

connecting a first set of lead wires to a motor;

routing the first set of lead wires to the front portion of a field case while pressing the motor into the field case from the front portion;

attaching a gear case to the field case;

attaching the field case to the first housing segment;

attaching the second housing segment to the field case and the first housing segment;

connecting a second set of lead wires to the motor; and routing the second set of lead wires from the motor through a rear portion of the field case and along the bridge section of the first housing prior to attaching the second housing segment.

20. A method according to claim 19, further comprising securing the second set of lead wires in the bridge section by routing the lead wires around at least one wire retention member.

* * * * *